(12) United States Patent
Dowalo

(10) Patent No.: US 7,677,106 B1
(45) Date of Patent: Mar. 16, 2010

(54) INTERNAL PRESSURE SENSOR

(75) Inventor: James A. Dowalo, Blackfoot, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 55 days.

(21) Appl. No.: 12/237,633

(22) Filed: Sep. 25, 2008

(51) Int. Cl.
*G01L 7/00* (2006.01)
(52) U.S. Cl. .......................... 73/714; 73/747
(58) Field of Classification Search ........... None
See application file for complete search history.

(56) References Cited

U.S. PATENT DOCUMENTS 7,213,464 B1 * 5/2007 Traudt .................. 73/717

* cited by examiner

*Primary Examiner*—Andre J Allen
(74) *Attorney, Agent, or Firm*—Fennemore Craig

(57) ABSTRACT

A pressure sensor for sensing changes in pressure in an enclosed vessel may include a first chamber having at least one expandable section therein that allows that first chamber to change in length. A reference member mounted within the first chamber moves as a result of changes in length of the first chamber. A second chamber having an expandable section therein allows the second chamber to change in length in response to changes in pressure in the enclosed vessel. The second chamber is operatively associated with the first chamber so that changes in length of the second chamber result in changes in length of the first chamber. A sensor operatively associated with the reference member detects changes in position of the reference member. Changes in position of the reference member are related to changes in pressure in the enclosed vessel.

28 Claims, 3 Drawing Sheets

INTERNAL PRESSURE SENSOR

CONTRACTUAL ORIGIN OF THE INVENTION

This invention was made with United States Government support under Contract No. DE-AC07-05-ID14517 awarded by the United States Department of Energy. The United States Government has certain rights in the invention.

TECHNICAL FIELD

This invention relates to pressure sensors in general and more specifically to methods and apparatus for sensing an internal pressure of a sealed container.

BACKGROUND

Nuclear fuels stored in pools are often dried and repackaged in canisters or vessels for transport and subsequent storage, e.g., wet or dry storage. While various processes have been developed for packaging nuclear fuels into such canisters or vessels, depending on the objectives of the specific program, most processes typically involve placing the nuclear fuel in the canisters or vessels, then purging them of air by establishing a vacuum within the canisters or by pressurizing them with an inert gas. The canisters are then sealed to prevent moisture leakage into the canisters. While the canisters may be leak tested prior to sealing to ensure canister integrity at the time of closure, there is no reliable nondestructive method for verifying that the canisters remain sealed when in storage. For example, one type of nondestructive method involves weighing the canisters. Unfortunately, however, such weighing techniques are not very sensitive, and usually cannot detect minor leakage. Ultrasonic methods have also been used with some success to detect free standing water in the canisters, but again, do not provide a high degree of sensitivity. That is, such ultrasonic methods usually cannot detect minor leaks. Radiographic imaging of the canisters has also been tried, but requires extensive and involved handling processes, particularly for highly irradiated fuels. No other methods other than tapping into the canister and sampling the internal atmosphere have been investigated to any great extent.

SUMMARY OF THE INVENTION

A pressure sensor for sensing changes in pressure in an enclosed vessel according to one embodiment of the present invention may comprise a first chamber having at least one expandable section therein that allows that first chamber to change in length. A reference member mounted within the first chamber moves as a result of changes in length of the first chamber. A second chamber has an expandable section therein that allows the second chamber to change in length in response to changes in pressure in the enclosed vessel. The second chamber is operatively associated with the first chamber so that changes in length of the second chamber result in changes in length of the first chamber. A sensor operatively associated with the reference member detects changes in position of the reference member. Changes in position of the reference member are related to changes in pressure in the enclosed vessel.

Another embodiment of a pressure sensor may include a first chamber having a first expandable section and a second expandable section. The first expandable section allows the first chamber to change in length. A fluid is provided within the first chamber. A reference member mounted within the first chamber at a location between the first and second expandable sections divides the first chamber into a detector section and an accumulator section and allows fluid to pass between the detector section and the accumulator section. A second chamber operatively associated with the detector section of the first chamber is provided with an expandable section. The expandable section of the second chamber allows the second chamber to change in length in response to changes in pressure in the enclosed vessel so that changes in length of the second chamber result in changes in length of the detector section of the first chamber and so that changes in length of the detector section of the first chamber result in movement of the reference member. A sensor operatively associated with the reference member detects movement of the reference member.

Also disclosed is a vessel having a first chamber mounted to a wall of the vessel so that the first chamber is located within the closed interior space of the vessel, the first chamber having at least one expandable section therein that allows the first chamber to change in length. A reference member mounted within the first chamber moves as a result of changes in length of the first chamber. A second chamber mounted to the first chamber has an expandable section therein that allows the second chamber to change in length in response to changes in pressure within the closed interior space of the vessel, changes in length of the second chamber resulting in changes in length of the first chamber. A sensor located external to the vessel senses changes in position of the reference member through the wall of the vessel, changes in position of the reference member being related to changes in pressure within the closed interior space of the vessel.

A method for sensing a pressure within an enclosed vessel may include: Positioning first and second chambers within the enclosed vessel, each of the first and second chambers including respective expandable sections that allow the first and second chambers to expand and contract in a lengthwise direction, only the second chamber expanding and contracting in response to pressure within the enclosed vessel, the first and second chambers being operatively associated with one another so that expansion and contraction of the second chamber causes the first chamber to expand and contract; allowing the second chamber to expand and contract within the enclosed vessel in response to the pressure within the enclosed vessel; and sensing a position of a reference member in the first chamber, the position of the reference member being related to the pressure within the enclosed vessel.

BRIEF DESCRIPTION OF THE DRAWING

Illustrative and presently preferred embodiment of the invention are shown in the accompanying drawing in which.

DETAILED DESCRIPTION OF THE PREFERRED EMBODIMENTS

Figure 2:
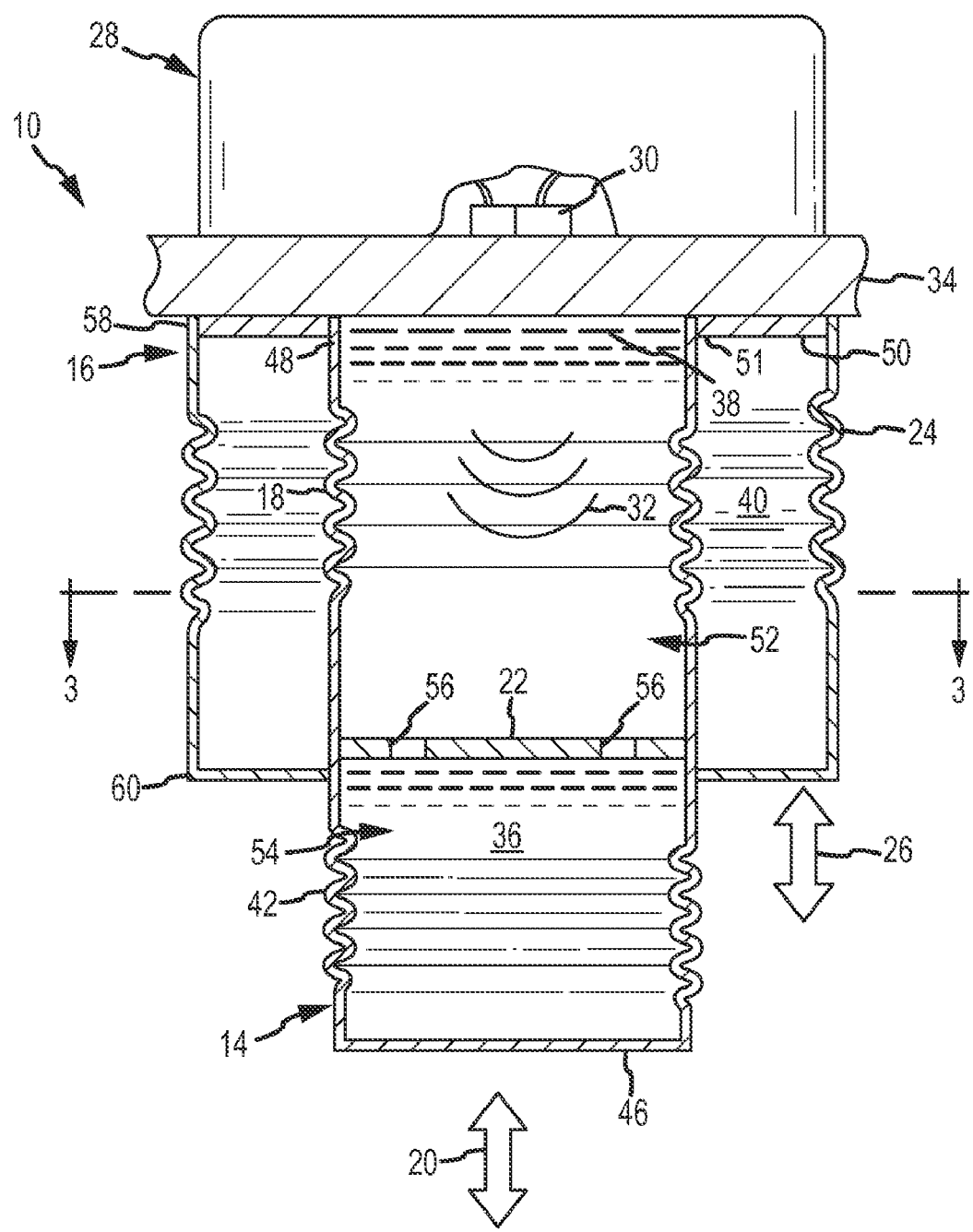
FIG. 2 is an enlarged cross-sectional view in elevation of the pressure sensor illustrated in FIG. 1.

A pressure sensor 10 according to one embodiment of the invention is shown and described herein as it could be used to sense changes in the internal pressure of an enclosed vessel 12. Referring now primarily to FIG. 2, pressure sensor 10 may comprise a first chamber 14 and a second chamber 16. First chamber 14 is provided with at least one expandable section

18 that allows the first chamber 14 to change in length, i.e., in the direction indicated by arrow 20. A reference member 22 is mounted within the first chamber 14 and moves as a result of changes in length of the first chamber 14. The second chamber 16 is also provided with an expandable section 24 that allows the second chamber 16 to change in length (i.e., in the direction indicated by arrow 26) in response to changes in pressure within enclosed vessel 12. The second chamber 16 is operatively associated with the first chamber 14 so that changes in length (i.e., 26) of the second chamber 16 result in changes in length (i.e., 20) of the first chamber 14.

In the embodiment shown and described herein, first chamber 14 is also provided with a second expandable section 42. Second expandable section 42 compensates for the internal volume change of first chamber 14 that would otherwise result from the movement of first expandable section 18. More specifically, a lengthening of first expandable section 18 will be accompanied by a shortening of second expandable section 42 and vice-versa. Accordingly, the internal volume of first chamber 14 will remain substantially constant even though the first expandable section 18 may increase and decrease in length.

Pressure sensor 10 may also comprise a sensor 28 that is operatively associated with the reference member 22 mounted within first chamber 14. In the embodiment shown and described herein, sensor 28 comprises an ultrasonic sensor 30 that is mounted at a location external to the enclosed vessel 12. Ultrasonic sensor 30 senses changes in position of the reference member 22 by transmitting and receiving sound waves 32 through a wall 34 of enclosed vessel 12.

In the embodiment shown and described herein wherein an ultrasonic sensor 30 is used to sense or determine the position of the reference member 22 with respect to some fixed position (e.g., the wall 34 of vessel 12), the interior region 36 of first chamber 14 may be filled with an "acoustic" fluid 38 capable of transmitting sound waves 32 without significant attenuation. Generally speaking, fluid 38 should also be substantially incompressible and may comprise any of a wide range of liquids or gels. The interior region 40 of second chamber 14 may be filled with a compressible fluid, such as a gas, in order to allow the second chamber to respond to changes in internal pressure of vessel 12.

Pressure sensor 10 may be operated as follows to sense changes in pressure, such as changes in pressure within enclosed vessel 12. Consider, for example, an initial condition wherein the internal pressure of vessel 12 is at some pressure $p_1$. This internal pressure $p_1$ will cause the second chamber 16 to move (e.g., expand or contract in length) until the pressure inside the second chamber 16 is substantially equal to pressure $p_1$. As mentioned above, movement of the second chamber 16 will result in a corresponding movement of first chamber 14 and the reference member 22 provided therein. Sensor 28 may be used to detect the position of reference member 22, which is related to the internal pressure $p_1$ of vessel 12. If the internal pressure of vessel 12 decreases to a pressure $p_2$ (e.g., as a result of a leak), the reduced internal pressure $p_2$ will result in a slight expansion or lengthening of second chamber 16. Because the second chamber 16 is attached to first chamber 14, the increased length of second chamber 16 will also cause the first chamber 14 to increase in length, e.g., via expandable section 18. The increase in length of first chamber 14 will result in a corresponding movement of reference member 22. Sensor 28 may then be used to detect the new position of reference member 22, which will be somewhat further from sensor 28 at the lower pressure $p_2$ than it was when the internal pressure of vessel 12 was the greater pressure $p_1$.

A significant advantage of the present invention is that it can be used to sense the internal pressure of an enclosed vessel without the need to penetrate the wall of the vessel. Consequently, the pressure sensor of the present invention may be used to advantage in situations wherein it is generally undesirable to penetrate the vessel in order to sense the internal pressure. For example, nuclear fuel is often packaged in vessels or containers that must remain sealed. One way to ensure that the vessels remain sealed is to monitor the internal pressure of the vessel. While any of a wide variety of pressure sensors may be used for this purpose, such sensors require some penetration of the vessel itself. The presence of such a penetration, no matter how well sealed, can be the source of potential leakage. In addition, radiological considerations also counsel against such penetration, which may be a source of radioactive leakage.

Having briefly described one embodiment of a pressure sensor according to the teachings of the present invention, as well as some of its more significant features and advantages, various embodiments of pressure sensors will now be described in detail.

Figure 1:
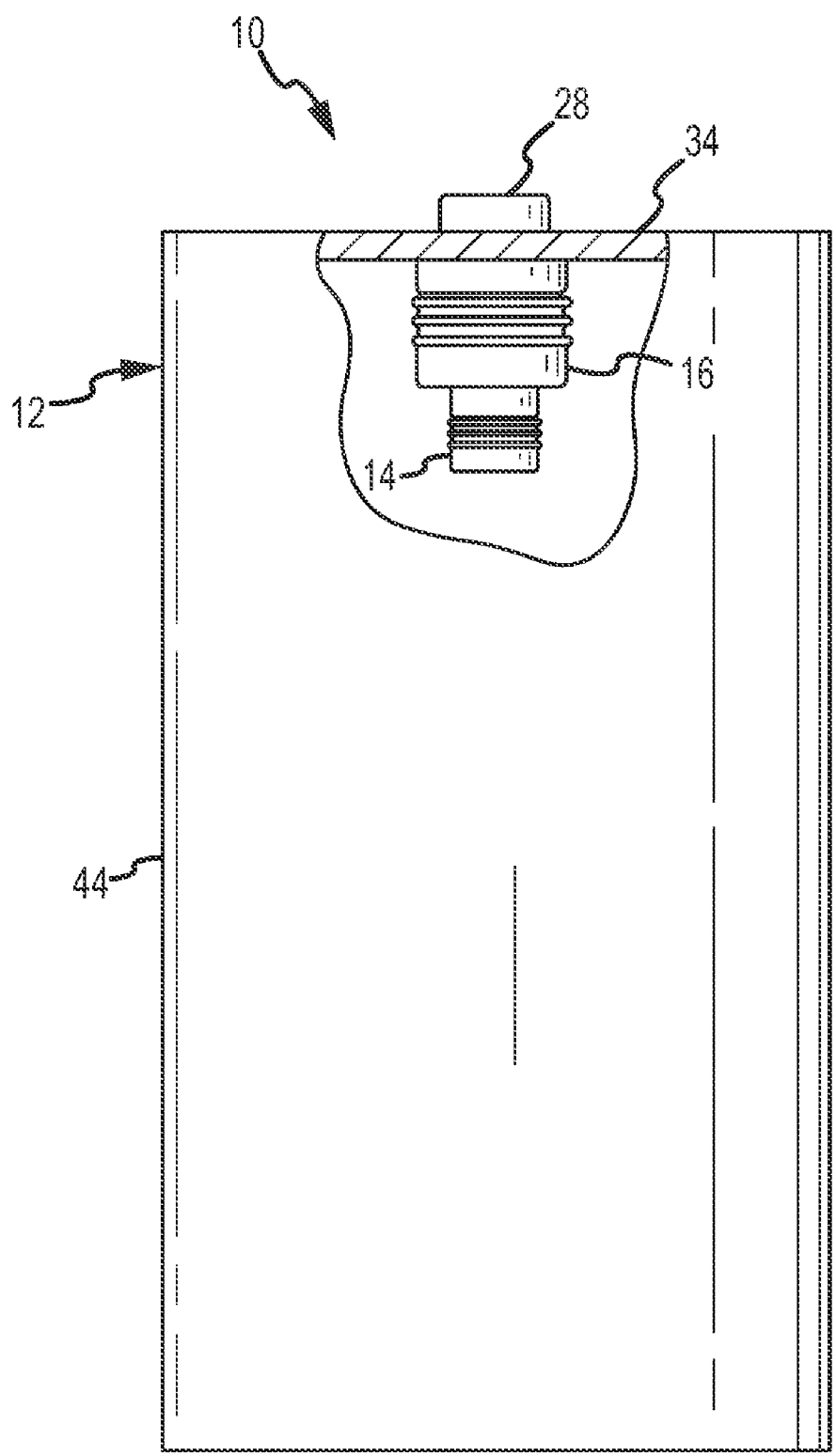
FIG. 1 is a plan view in elevation of a vessel with a portion broken away to reveal a pressure sensor for sensing changes in internal pressure in the vessel.
Figure 3:
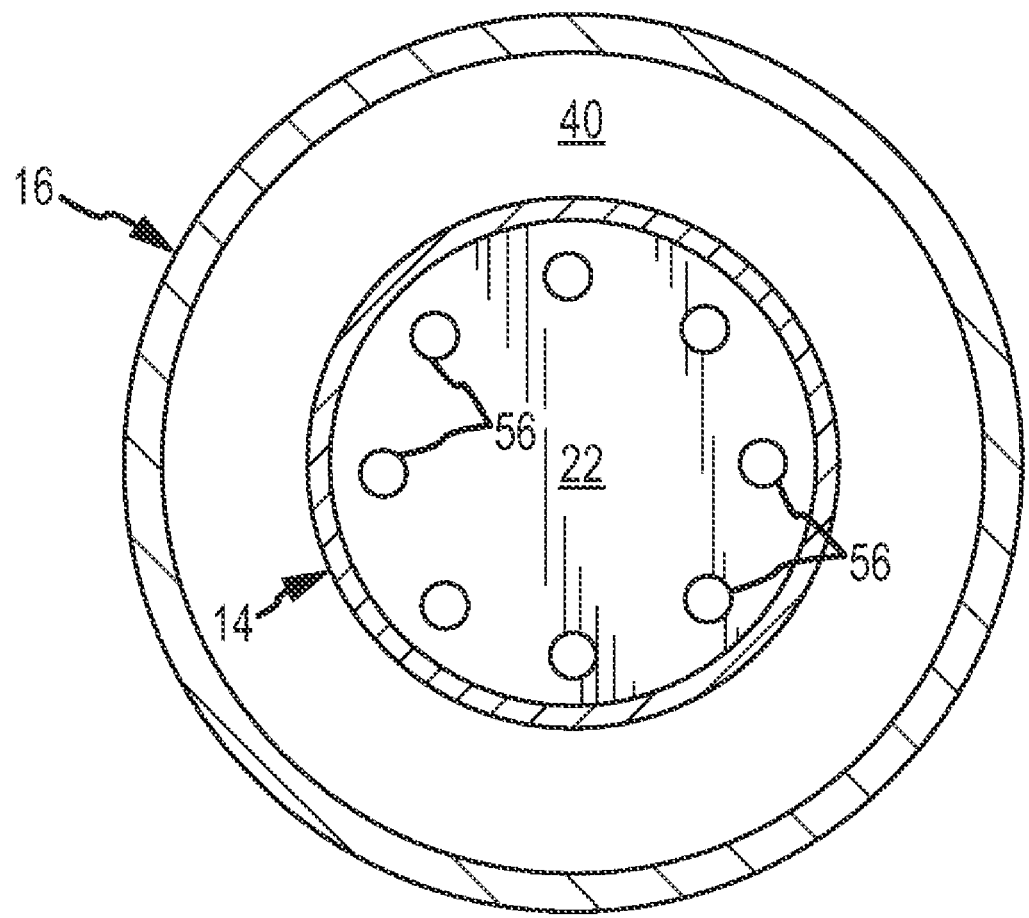
FIG. 3 is a cross-sectional plan view of the pressure sensor taken along the line 3-3 of FIG. 2.

Referring now to FIGS. 1-3, one embodiment of a pressure sensor 10 according to the teachings of the present invention is shown and described herein as it could be used to measure the internal pressure of a sealed vessel 12 of the type used to store nuclear fuel. More specifically, vessel 12 may comprise a generally cylindrically shaped container 44 having a lid or end wall 34 suitable for closing off and sealing the open end of container 44. The pressure sensor 10 may be mounted to the lid or end wall 34, thereby allowing the pressure sensor 10 to be incorporated into the vessel 12 when the vessel 12 is sealed. Alternatively, the pressure sensor 10 may be mounted at any other convenient location on vessel 12.

Referring now primarily to FIG. 2, pressure sensor 10 may comprise a first chamber 14 and a second chamber 16. In the embodiment shown and described herein, first chamber 14 may comprise a generally cylindrically shaped member having a closed end 46 and a generally open end 48. Open end 48 of first chamber 14 may be mounted to a ring-shaped end plate 50 having a central opening 51 therein that is sized to receive the open end 48 of first chamber 16. Open end 48 may be attached to ring-shaped end plate 50 by any convenient means (e.g., by welding, brazing, soldering, etc.) so that first chamber 14 comprises a generally sealed enclosure when the pressure sensor 10 is mounted to the lid or end wall 34, as best seen in FIG. 2. Alternatively, other configurations and structural arrangements are possible. For example, while the first chamber 14 shown and described herein comprises a generally cylindrical shape (i.e., having a generally circular cross-section), other embodiments of first chamber 14 may have other cross-sectional shapes. It is also not necessary for the first chamber 14 to have a cross-sectional area that is substantially constant along the length of the chamber 14. Other embodiments may have cross-sectional areas that are not constant along the length of the first chamber 14. Still other variations are possible, as would become apparent to persons having ordinary skill in the art after having become familiar with the teachings provided herein. Consequently, the present invention should not be regarded as limited to a first chamber 14 having the particular configuration shown and described herein.

First chamber 14 may also be provided with a first expandable section 18 that allows the first chamber 14 to change in length, i.e., expand and contract generally in the direction indicated by arrow 20. First chamber 14 may also be provided with a second expandable section 42. As mentioned above, the second expandable section 42 may be provided in order to compensate for volume changes within first chamber 14 that would otherwise occur as a result of the movement of the first expandable section 18. First and second expandable sections 18 and 42 may comprise respective corrugated or bellows sections that allow for expansion and contraction along the length of first chamber 14, e.g., generally in the lengthwise direction indicated by arrows 20. In this regard it should be noted that while the first expandable section 18 is constructed so that it allows the first chamber 14 to expand and contract in a lengthwise direction 20, no such constraint is placed on the second expandable section 42. That is, because second expandable section 42 merely serves as a variable volume reservoir or accumulator in order to compensate for internal volume changes in first chamber 14 resulting from the movement of first expandable section 18, second expandable section 42 may expand in any direction (e.g., in a lengthwise direction, a radial direction, or some combination thereof). Consequently, second expandable section 42 should not be regarded as limited to allowing expansion and contraction of first chamber 14 in any particular direction.

First chamber 14 may be constructed from any of a wide range of materials, such as metals or plastics, that would be suitable for the particular application. By way of example, in one embodiment, first chamber 14 is fabricated from stainless steel. Alternatively, other materials could also be used, as would become apparent to persons having ordinary skill in the art after having become familiar with the teachings provided herein. Consequently, the present invention should not be regarded as limited to any particular materials.

First chamber 14 may also include a reference member 22 mounted therein. Reference member 22 should be positioned between the first and second expandable sections 18 and 42, so that movement of the first expandable section 18 (e.g., in the lengthwise direction 20) will result in corresponding movement of the reference member 22 in the lengthwise direction 20. However, movement of second expandable section 42 will not result in the movement of reference member 22 in the lengthwise direction 20. As will be discussed in greater detail below, the relative position of reference member 22 with respect to some fixed datum (e.g., end 48 of first chamber 14) is detected by sensor 28. The position of reference member 22 between the first and second expandable sections 18 and 42 divides or partitions first chamber 14 into a detector section 52 and an accumulator section 54. See FIG. 2.

Reference member 22 may comprise any of a wide range of structures and configurations suitable for the particular application and suitable for detection by sensor 28. By way of example, in one embodiment, reference member 22 comprises a generally circular, disk-like member, as best seen in FIG. 3. Reference member 22 should allow the free flow of fluid 38 between the detector section 52 and accumulator section 54 as the first expandable section 18 expands and contracts in the direction indicated by arrows 20. In the case where the reference member 22 comprises a generally circular, disk-like member, reference member 22 may be provided with one or more holes or perforations 56 therein to allow fluid 38 to flow between the detector section 52 and accumulator section 54. Alternatively, such holes or perforations need not be provided if the reference member 22 comprises a structure having a different configuration. For example, in another embodiment, reference member 22 may comprise an L-shaped tab, the short leg being attached to the side wall of first chamber 14 and the long leg extending radially inwardly. In such a configuration, the long leg of the tab need not be provided with separate holes as the fluid 38 would be free to flow around the long leg of the L-shaped tab.

Reference member 22 may be fabricated from any of a wide range of materials, such as metals or plastics, that would be suitable for the intended application. By way of example, in one embodiment, reference member 22 comprises stainless steel. Alternatively, other materials may also be used, as would become apparent to persons having ordinary skill in the art after having become familiar with the teachings provided herein. Reference member 22 may be mounted within first chamber 14 by any convenient means (e.g., by adhesives or by welding) suitable for fixedly attaching reference member 22 at the desired position between the first and second expandable sections 18 and 42.

Pressure sensor 10 may also comprise a second chamber 16 having an expandable section 24 that allows second chamber 16 to expand and contract in a lengthwise direction (e.g., in the direction indicated by arrows 26) with changes in internal pressure of vessel 12. More specifically, and in the embodiment shown and described herein, second chamber 16 comprises a generally cylindrically shaped member having a proximal end 58 and a distal end 60. Proximal end 58 may be mounted to ring-shaped end plate 50 (e.g., by welding, brazing, soldering, etc.), whereas distal end 60 is mounted to the first chamber 14 (e.g., also by welding) at a position between the first and second expandable sections 18 and 42. See FIG. 2. Consequently, a sealed interior region or annulus 40 is defined between the first and second chambers 14 and 16. Expandable section 24 may comprise a plurality of corrugations to define a bellows-like section that will allow the second chamber 16 to expand and contract in a generally lengthwise direction (i.e., in the directions indicated by arrows 26).

As was the case for first chamber 14, second chamber 16 is not limited to the generally cylindrical configuration shown and described herein. For example, while one embodiment of the second chamber 16 comprises a generally cylindrical shape (i.e., having a generally circular cross-section), other embodiments may have other cross-sectional shapes. It is also not necessary for the second chamber 16 to have a cross-sectional area that is substantially constant along the length of the chamber 16, and other embodiments may have cross-sectional areas that are not constant along the length of the second chamber 16. Still other variations are possible, as would become apparent to persons having ordinary skill in the art after having become familiar with the teachings provided herein. Consequently, the present invention should not be regarded as limited to a second chamber 16 having the particular configuration shown and described herein.

Second chamber 16 may be constructed from any of a wide range of materials, such as metals or plastics, that would be suitable for the particular application. By way of example, in one embodiment, second chamber 16 is fabricated from stainless steel. Alternatively, other materials could also be used, as would become apparent to persons having ordinary skill in the art after having become familiar with the teachings provided herein. Consequently, the present invention should not be regarded as limited to a second chamber 16 being constructed from any particular material.

Pressure sensor 10 may also comprise a sensor 28 suitable for sensing the position of reference member 22. By way of example, in one embodiment, sensor 28 comprises an ultrasonic sensor 30 that senses changes in position of the reference member 22 by transmitting and receiving sound waves 32 through wall 34 and open end 48 of enclosed vessel 12. Alternatively, other types of non-contact position sensors, either now known in the art or that may be developed in the future, could also be used, as would become apparent to persons having ordinary skill in the art after having become familiar with the teachings provided herein. Consequently, the present invention should not be regarded as limited to any particular type of sensor 28.

If sensor 28 comprises an ultrasonic sensor 30, the interior region 36 defined by first chamber 14 may be filled with an acoustic fluid 38 capable of transmitting sound waves 32 with a minimum of attenuation. Generally speaking, fluid 38 should also be substantially incompressible so that internal pressure changes in vessel 12 will not result in appreciable movement (e.g., expansion and contraction) of first expandable section 18. By way of example, in one embodiment, fluid 38 may comprise a liquid, such as water, suitable for the particular application and the expected temperature regimes. Alternatively, fluid 38 could comprise a gel-like material, such as "Ultragel II" acoustic couplant manufactured by Sonotech, Inc., of Bellingham, Wash. (US).

The interior region 40 defined between the second chamber 16 and first chamber 14 may be filled with a compressible fluid, such as a gas, to allow the second chamber 16 to expand and contract in a lengthwise direction 26 in response to pressure changes within vessel 12. Exemplary gases include, but are not limited to, air, nitrogen, helium, and argon. The gas contained within region 40 of second chamber 16 should be provided at a pressure close to the expected normal internal pressure of vessel 12 to avoid excessive expansion or contraction of pressure sensor 10 when it is installed in vessel 12 and the normal internal pressure achieved. Consequently, the present invention should not be regarded as limited to any particular gas at any particular pressure.

Pressure sensor 10 may be mounted to pressure vessel 12 to allow the internal pressure of the vessel 12 to be monitored. In one example mounting arrangement, the end plate 50, to which the first and second chambers 14 and 16 are mounted, may be attached to the inside of end cap or wall 34 of vessel 12. Sensor 28 may be mounted on the outside of end cap or wall 34 so that the ultrasonic sensor 30 is able to sense the position of reference member 22. In this type of arrangement, it will be generally desirable to achieve a good acoustic coupling between sensor 30 and wall 34.

Pressure sensor 10 may be used as follows to sense changes in pressure within an enclosed vessel 12. Assuming that the pressure sensor 10 has been mounted to the end cap or wall 34 of vessel 12 and that the vessel 12 has been sealed with the proper internal pressure p1 established, sensor 28 may be operated to determine the position of reference member 22. In the example embodiment shown and described herein, sensor 28 may determine the position of reference member 22 by transmitting and detecting sound waves 32. More specifically, ultrasonic sensor 30 may transmit sound waves 32. Sound waves 32 are conducted through the end cap or wall 34 of vessel 12. Thereafter, sound waves 32 are conducted through fluid 38 contained within first chamber 14, whereupon they impinge reference member 22. Some of the energy of the sound waves 32 will be reflected back through fluid 38 and wall 34 before being detected by ultrasonic sensor 30. A suitable data processor (not shown) associated with ultrasonic sensor 30 may then process the data as necessary to arrive at a determination of the relative position or distance separating ultrasonic sensor 30 and reference member 22. As mentioned above, that distance may be used as a baseline for subsequent measurements.

If the pressure p1 within vessel 12 decreases to a lower pressure p2, for example as a result of a leak, the lower internal pressure p2 will result in the expansion of the second chamber 16 (e.g., via expandable section 24) until the internal pressure within second chamber 16 is substantially equal to the internal pressure p2 within vessel. The lengthwise expansion of second chamber 16 will cause the first chamber 14 to expand by a like distance (e.g., via first expandable section 18). The expansion of first chamber 14 via first expandable section 18 will result in an increase in the internal volume of the detector section 52 of first chamber 14. As a result, fluid 38 from the accumulator section 54 will flow into the detector section 52 (e.g., via the holes 56 provided in detector member 22). The second expandable section 42 of first chamber 14 will therefore contract somewhat as the fluid 38 flows from the accumulator section 54 to the detector section 52. Because fluid 38 is also substantially incompressible, the internal pressure change within vessel 12 will not result in any substantial movement of either first or second expandable sections 18 and 42. That is, the movement of first expandable section 18 is solely the result of the movement of second chamber 16.

The expansion of the first expandable section 18 of first chamber 14 will result in a corresponding movement of the detector member 22 in the lengthwise direction 20. That is, detector member 22 will move further away from sensor 28. The increased distance between sensor 28 and reference member 22 will be sensed by sensor 28 (e.g., via ultrasonic sensor 30 and sound waves 32 in the manner already described), thereby indicating the lower internal pressure p2 within vessel 12. Appropriate action may then be taken, if necessary.

Pressure sensor 10 may also be used to detect increases in internal pressure within vessel 12. More specifically, an increase in internal pressure will result in the shortening or contraction of second chamber 16 in the lengthwise direction 26, which results in a corresponding shortening or contraction of first chamber 14. As a result, reference member 22 will move closer to the sensor 28. The decreased distance between sensor 28 and reference member 22 will be sensed by sensor 28 (e.g., via ultrasonic sensor 30 and sound waves 32), thereby indicating the higher internal pressure within vessel 12. If necessary, appropriate action can be taken.

Having herein set forth preferred embodiments of the present invention, it is anticipated that suitable modifications can be made thereto which will nonetheless remain within the scope of the invention. The invention shall therefore only be construed in accordance with the following claims.

The invention claimed is:

1. A pressure sensor for sensing changes in pressure in an enclosed vessel, comprising:

a first chamber having at least one expandable section therein that allows said first chamber to change in length;

a reference member mounted within said first chamber, said reference member moving as a result of changes in length of said first chamber;

a second chamber operatively associated with at least a portion of said first chamber, said second chamber having at least one expandable section therein that allows said second chamber to change in length in response to changes in pressure in the enclosed vessel, changes in length of the second chamber resulting in changes in length of said first chamber; and a sensor operatively associated with said reference member, said sensor sensing changes in position of said reference member, changes in position of said reference member being related to changes in pressure in the enclosed vessel.

2. The pressure sensor of claim 1, wherein said first chamber is filled with a first fluid.

3. The pressure sensor of claim 2, wherein said first fluid is substantially incompressible.

4. The pressure sensor of claim 2, wherein said first fluid comprises one or more selected from the group consisting of liquids and gels.

5. The pressure sensor of claim 2, wherein said second chamber is filled with a second fluid.

6. The pressure sensor of claim 5, wherein said second fluid is compressible.

7. The pressure sensor of claim 5, wherein said second fluid comprises a gas.

8. The pressure sensor of claim 1, wherein said sensor comprises an ultrasonic sensor.

9. The pressure sensor of claim 1, wherein said first chamber comprises a substantially cylindrically shaped member.

10. The pressure sensor of claim 9, wherein said first expandable section comprises a bellows section.

11. The pressure sensor of claim 10, wherein said second chamber comprises a substantially cylindrically shaped member mounted to said first chamber so that said substantially cylindrically shaped second chamber surrounds at least the first expandable section of said first chamber.

12. The pressure sensor of claim 11, wherein the expandable section of said second chamber comprises a bellows section.

13. The pressure sensor of claim 1, wherein said first chamber further comprises a second expandable section, said reference member being located between the first expandable section and the second expandable section.

14. The pressure sensor of claim 1, wherein said first chamber comprises a first end that is mountable to a wall of the enclosed vessel so that said first and second chambers are located within the enclosed vessel, and wherein said sensor is positionable outside said enclosed vessel.

15. The pressure sensor of claim 14, wherein said sensor comprises an ultrasonic sensor, said ultrasonic sensor sensing changes in position of reference member by transmitting and receiving sound waves through the wall of the enclosed vessel.

16. A pressure sensor for sensing changes in pressure in an enclosed vessel, comprising:
    a first chamber having a first expandable section and a second expandable section, the first expandable section allowing at least a portion of said first chamber to change in length;
    a fluid provided within said first chamber;
    a reference member mounted within said first chamber at a location between the first and second expandable sections, said reference member dividing said first chamber into a detector section and an accumulator section, said reference member allowing fluid to pass between said detector section and said accumulator section;
    a second chamber operatively associated with the detector section of said first chamber, said second chamber having an expandable section, the expandable section of said second chamber allowing said second chamber to change in length in response to changes in pressure in the enclosed vessel, changes in length of said second chamber resulting in changes in length of the detector section of said first chamber, changes in length of the detector section of said first chamber resulting in movement of said reference member; and
    a sensor operatively associated with said reference member, said sensor detecting movement of said reference member, movement of said reference member being related to changes in pressure in the enclosed vessel.

17. The pressure sensor of claim 16, wherein the fluid provided within the first chamber is substantially incompressible.

18. The pressure sensor of claim 16, wherein the fluid provided with the first chamber comprises one or more selected from the group consisting of liquids and gels.

19. The pressure sensor of claim 16, wherein said second chamber is filled with a compressible fluid.

20. The pressure sensor of claim 16, wherein said second chamber is filled with a gas.

21. A vessel having a wall for defining a closed interior space, comprising:
    a first chamber mounted to the wall of said vessel so that said first chamber is located within the closed interior space of said vessel, said first chamber having at least one expandable section therein that allows said first chamber to change in length;
    a reference member mounted within said first chamber, said reference member moving as a result of changes in length of said first chamber;
    a second chamber mounted to said first chamber, said second chamber having at least one expandable section therein that allows said second chamber to change in length in response to changes in pressure within the closed interior space of said vessel, changes in length of the second chamber resulting in changes in length of said first chamber; and
    a sensor located external to said vessel, said sensor sensing changes in position of said reference member through the wall of said vessel, changes in position of said reference member being related to changes in pressure within the closed interior space of said vessel.

22. The vessel of claim 21, wherein said sensor comprises an ultrasonic sensor, said ultrasonic sensor sensing changes in position of said reference member by transmitting and receiving sound waves through the wall of said vessel.

23. The vessel of claim 22, wherein said first chamber is filled with a substantially incompressible fluid.

24. The vessel of claim 22, wherein said first chamber is filled with a fluid comprising one or more selected from the group consisting of liquids and gels.

25. The vessel of claim 24, wherein said second chamber is filled with a gas.

26. A method for sensing a pressure within an enclosed vessel, comprising:
    positioning first and second chambers within the enclosed vessel, each of the first and second chambers including respective expandable sections that allow the first and second chambers to expand and contract in a lengthwise direction, only the second chamber expanding and contracting in response to pressure within the enclosed vessel, the first and second chambers being operatively associated with one another so that expansion and contraction of the second chamber causes the first chamber to expand and contract;
    allowing the second chamber to expand and contract within the enclosed vessel in response to the pressure within the enclosed vessel; and
    sensing a position of a reference member in the first chamber, the position of the reference member being related to the pressure within the enclosed vessel.

27. The method of claim 26, wherein sensing the position of a reference member comprises:
    mounting a sensor at a location exterior to the enclosed vessel; and using the sensor to determine the position of the reference member.

28. The method of claim 27, wherein using the sensor to determine the position of the reference member comprises:
transmitting sound waves toward the reference member in the first chamber so that at least a portion of the energy contained in the sound waves is reflected by the reference member toward a detector as reflected sound waves; and detecting the reflected sound waves.

* * * * *